(12) United States Patent
Weiss

(10) Patent No.: US 6,913,234 B2
(45) Date of Patent: Jul. 5, 2005

(54) ROD CLAMP

(76) Inventor: Sondra Weiss, 2158 Cartwright Pl., Reston, VA (US) 20181

( * ) Notice: Subject to any disclaimer, the term of this patent is extended or adjusted under 35 U.S.C. 154(b) by 0 days.

(21) Appl. No.: 10/765,982

(22) Filed: Jan. 29, 2004

(65) Prior Publication Data

US 2004/0182977 A1 Sep. 23, 2004

Related U.S. Application Data

(63) Continuation-in-part of application No. 10/265,897, filed on Oct. 7, 2002, now Pat. No. 6,688,569.

(51) Int. Cl.[7] ................................................ E04G 5/06
(52) U.S. Cl. .................................. 248/231.71; 5/503.1
(58) Field of Search ....................... 248/231.71, 229.1, 248/229.12, 229.14, 229.15, 229.22; 269/6, 3, 43, 45, 147, 143, 249; 5/503.1, 658

(56) References Cited

U.S. PATENT DOCUMENTS

| 369,971 | A | | 9/1887 | Stillman |
|---|---|---|---|---|
| 450,474 | A | | 4/1891 | Parker |
| 1,120,798 | A | | 12/1914 | Duecker |
| 1,405,113 | A | | 1/1922 | Gwinn |
| 1,776,785 | A | * | 9/1930 | Davidson .................. 248/201 |
| 2,958,110 | A | | 11/1960 | McBrien |
| 3,011,235 | A | * | 12/1961 | Pacheco ................... 172/776 |
| 3,268,946 | A | * | 8/1966 | Case ........................... 16/253 |
| 3,565,380 | A | | 2/1971 | Langren |
| 4,500,077 | A | | 2/1985 | Coxon |
| 4,946,122 | A | | 8/1990 | Ramsey et al. |
| 5,078,348 | A | | 1/1992 | Babitchenko |
| 5,184,911 | A | | 2/1993 | Wu |
| 5,398,602 | A | | 3/1995 | Taylor |
| 6,079,678 | A | | 6/2000 | Schott et al. |
| 6,550,128 | B1 | | 4/2003 | Lorenz |
| 6,585,206 | B2 | | 7/2003 | Metz et al. |

FOREIGN PATENT DOCUMENTS

| DE | 3209984 | 5/1983 |
|---|---|---|
| DE | 4129707 | 3/1993 |

* cited by examiner

Primary Examiner—Leslie A. Braun
Assistant Examiner—Kofi Schulterbrandt
(74) Attorney, Agent, or Firm—Shoemaker and Mattare

(57) ABSTRACT

A rod is gripped by a clamp which is removably seated in a lateral recess in a hand-held rod holder. The clamp is tightened around the rod by turning a threaded actuator. The holder configuration is easily changed from right-handed to left-handed by removing the rod and reversing the clamp in its recess. The body of the holder has a fixed jaw, and a separate movable jaw is provided so one can secure the body to a fixture such as a hospital bed. When a pair of the rod holders are mounted at opposite ends of a common rod, they can be adjusted along the rod, and angularly about the rod with respect to each other, thus forming a versatile clamping system for temporarily linking diverse objects.

10 Claims, 3 Drawing Sheets

ROD CLAMP

This application is a continuation-in-part of application Ser. No. 10/265,897, filed Oct. 7, 2002, now U.S. Pat. No. 6,688,569.

BACKGROUND OF THE INVENTION

This invention relates to an improved holder for securing a rod to a fixture, and for permitting adjustment of the rod's height and orientation. The invention also relates to a clamping system in which two holders, situated on a common rod, are attached to ordinarily separate objects to provide an adjustable, secure, yet temporary connection between them.

The need for temporarily interconnecting movable objects occurs in many different environments. For example, in a hospital, when a patient must be moved to a different room, it is usually necessary simultaneously to move I.V. poles, monitoring devices and other equipment attached to the patient. In complex procedures, such as heart transplantation, three or four poles, each supporting a different device, may be needed. The number of people needed to make the move can be reduced by connecting these devices to the bed, Gurney or wheel chair supporting the patient.

Some of the equipment which is attached to a bed for patient transportation may be very expensive; partly for that reason, it is very important that the connection between a supporting pole and the fixture be secure. At the same time, the attaching structures themselves should not add a lot of weight to the bed.

Various types of clamps have been adapted to connect supporting rods to fixtures such as hospital beds, but none is sufficiently adaptable and easy to use. Generic clamps are difficult to manipulate. It would be an improvement to provide a clamp which could be conveniently manipulated with one hand, and easily tightened to different movable objects.

SUMMARY OF THE INVENTION

An object of the invention is to provide a clamp, suitable for securing a medical apparatus to a bed or other fixture, which can be adjusted both linearly along its axis and angularly about the axis.

It is also an objective to provide a light weight clamp which is easy to adjust linearly and angularly, yet which is reliable and secure once set in position.

Another object it to provide a hand-held rod holder which can be changed quickly and easily between right-handed and left-handed configurations.

These and other objects are attained by the rod holder described below.

BRIEF DESCRIPTION OF THE DRAWINGS

In the accompanying drawings.

DESCRIPTION OF THE PREFERRED EMBODIMENT

Figure 1:
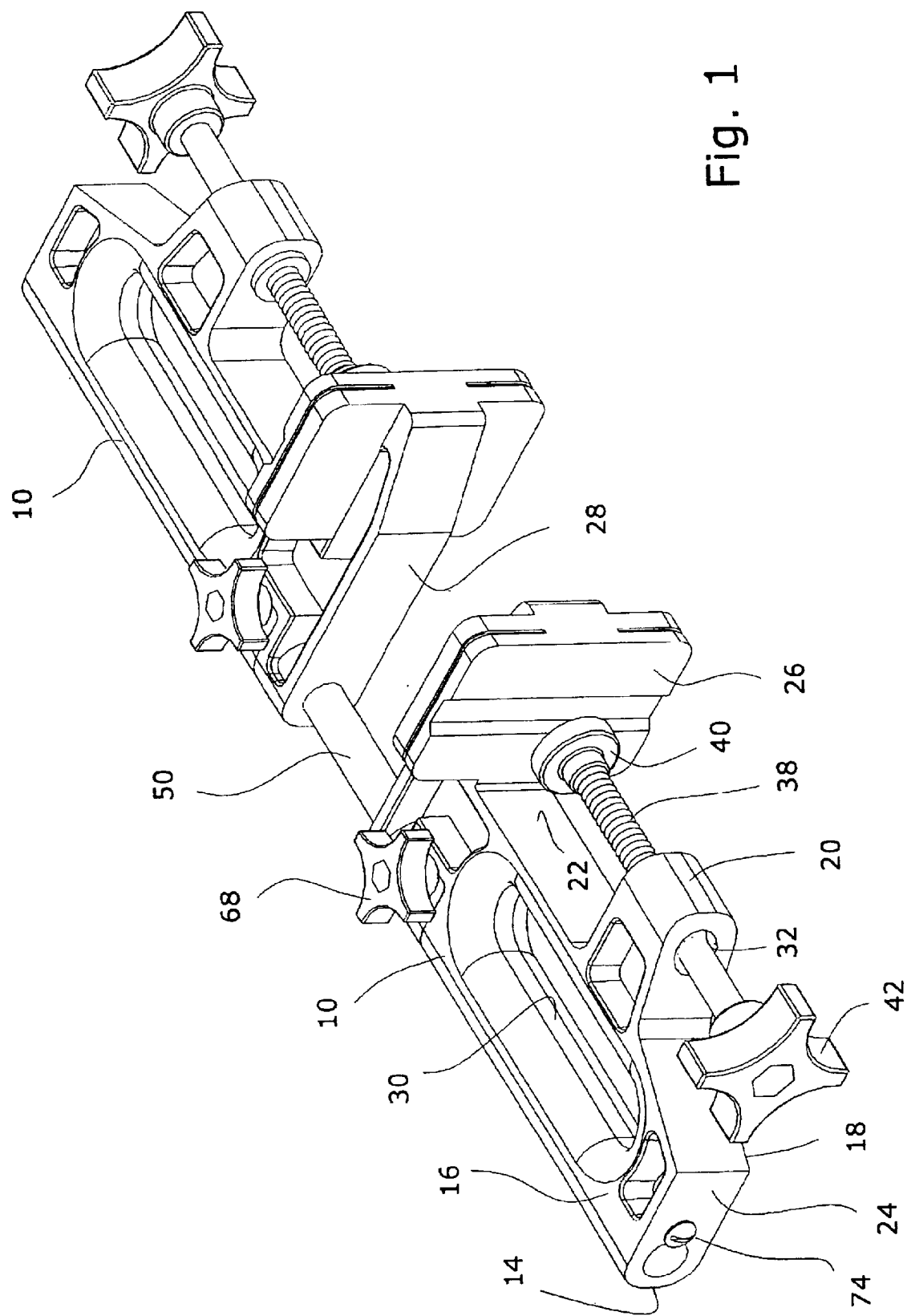
FIG. 1 is a perspective view of pair of rod holders embodying the invention.
Figure 2:
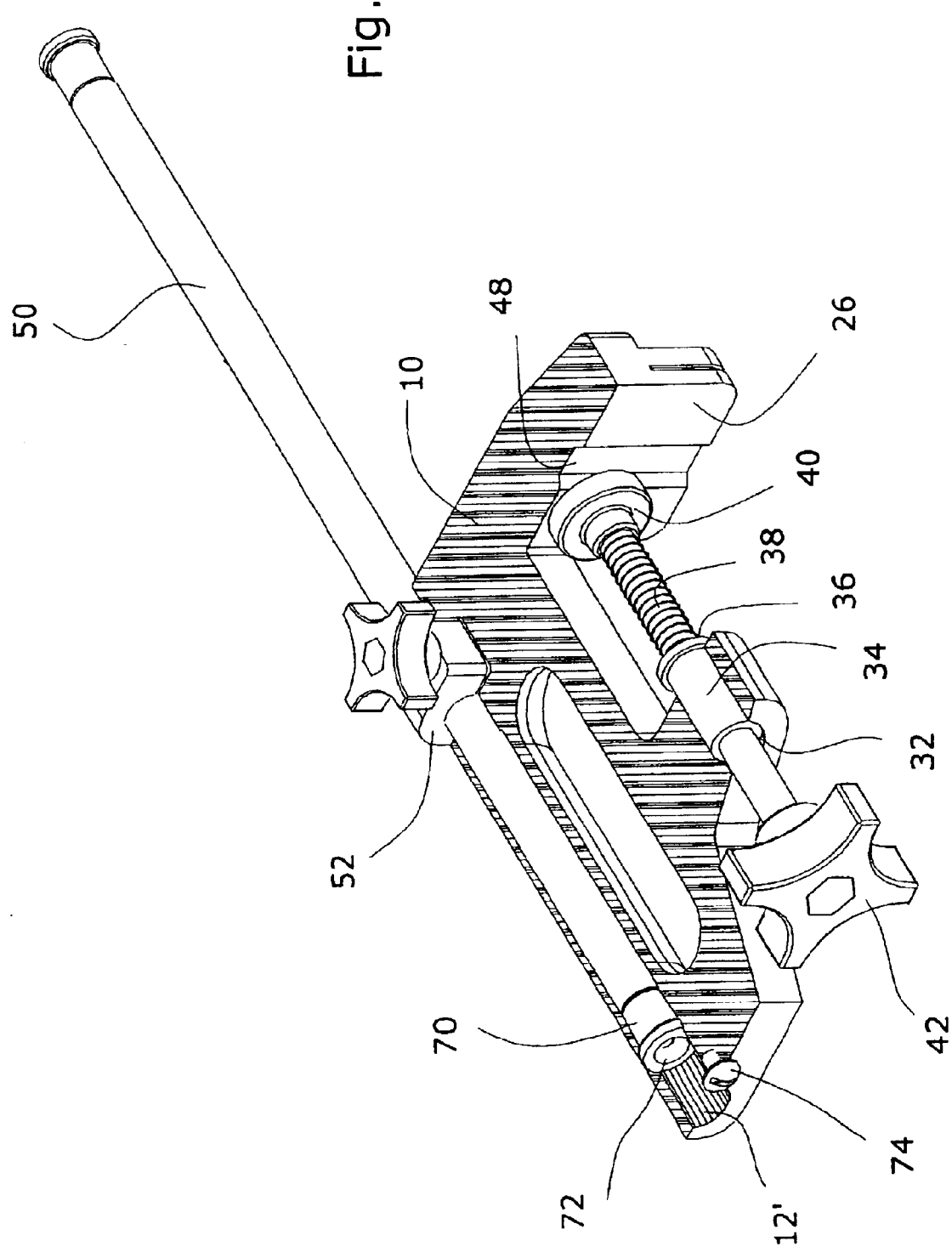
FIG. 2 is a cutaway view showing internal parts of the device.

Each of the rod holders shown in FIG. 1 comprises a body 10 molded from a hard polymeric material. The body has a through bore 12 (FIG. 2) extending lengthwise parallel to and just below the top surface 14 (FIG. 1) of the body. The body is bounded by parallel right and left sides 16, 18. A boss 20 protrudes downward from the bottom surface 22 of the body, near its rear end 24. A fixed jaw 26 extends from the bottom surface at the front end 28 of the body A large elongate slot 30 passes transversely through the body. Its edges are rounded to provide a comfortable hand hold.

The boss has a hole 32 (FIG. 2), counterbored at the front. The hole's axis is preferably parallel to that of the bore 12. A metal insert 34 is seated in the hole 32. The insert has a shoulder 36 at the front to prevent the insert from being pushed rearward. The insert is internally threaded and receives a clamping screw 38 whose front end supports a polymeric pad 40. By turning a handle 42 fixed to the rear end of the screw, one can advance the pad 40 toward the fixed jaw 26 and clamp the body to an object such as a hospital bed. The rear face of the fixed jaw has a widthwise groove 48 to assist in clamping cylindrical objects.

The rod 50, which has a sliding fit within the bore 12, can be locked in various positions by a clamp member 52 which is normally seated in a recess 54 (FIG. 3) in the body. The recess transversely intersects the bore 12, and the clamp member is designed so that—when it is seated in the recess—its bore 56 is aligned with the bore 12.

Figure 3:
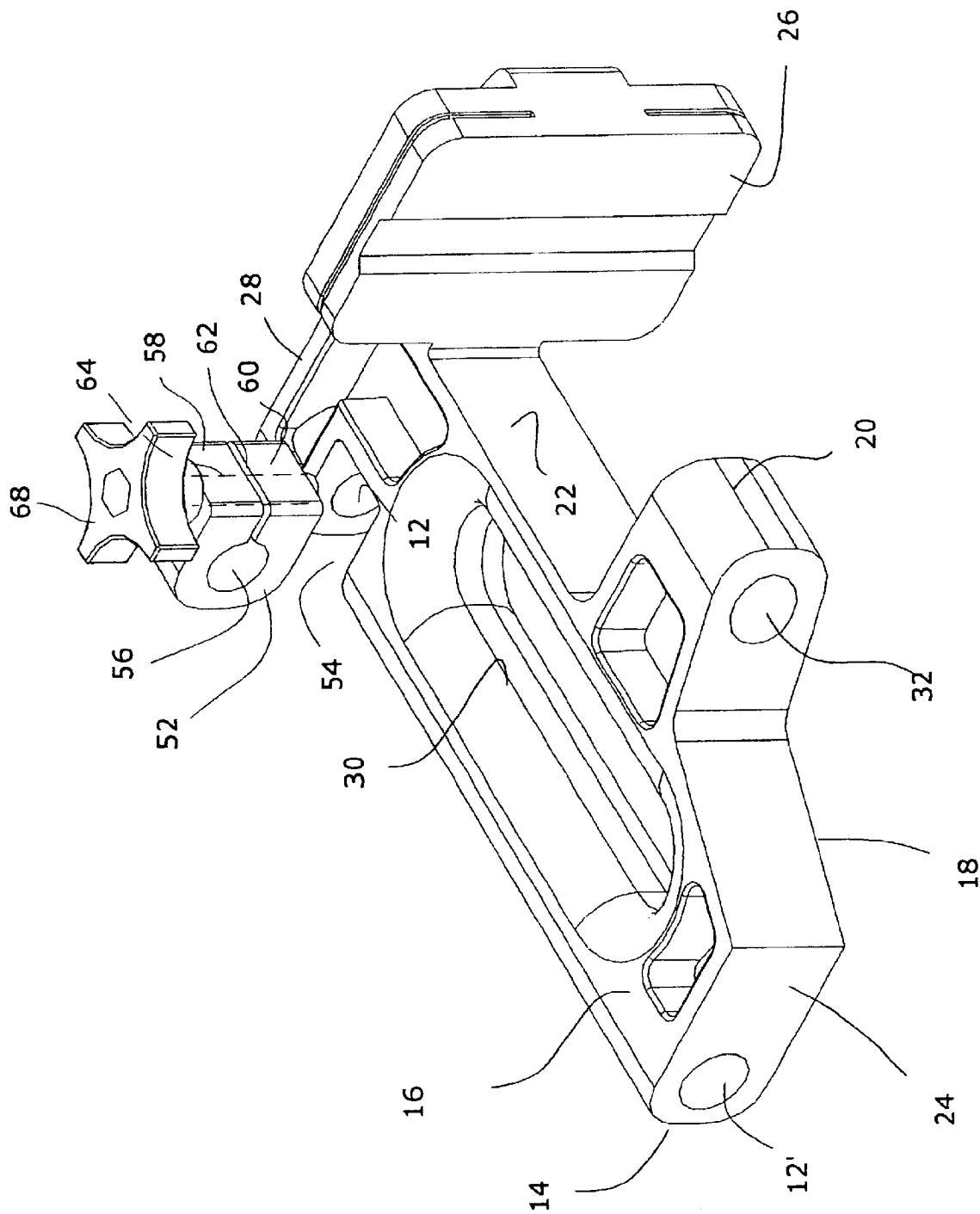
FIG. 3 shows the body of the device, with its clamp element in a removed position.

The clamp 52 has a pair of arms 58, 60 separated by a circumferential discontinuity (a gap 62) which intersects the clamp bore 56. The diameter of the bore 56 is such that, when the clamp is relaxed, it has a sliding fit on the rod 50, so the rod can be moved, both along its axis and around its axis. Once the desired rod position is achieved, the clamp is tightened by rotating a threaded actuator 64 (FIG. 3). This element passes through an unthreaded hole in one arm 58 and into a threaded hole in the other arm 60. Turning the handle 68 fixed on the actuator clockwise reduces the gap width and thus tightens the clamp about the rod. The handle is shown at the right end of the actuator in the drawings, but, as mentioned below, the clamp can easily be reversed so that the handle is on the left.

As long as the rod is within the clamp, the clamp cannot be removed; however, when the rod is withdrawn lengthwise, the clamp can be lifted laterally out of the recess. An advantage of this design is that one can then quickly reverse the clamp, changing it from a right-handed to a left-handed configuration, and reinsert the rod. Another advantage is that, because all the rod gripping is done by the precision-machined clamp, the diameter of the bore 12 in the molded part need not be so exacting.

When it is tightened on the rod, the clamp cannot turn within the recess, because of contact between its flat bottom and the flat bottom of the recess. Thus the rod is prevented from moving either lengthwise along its axis, or angularly about its axis (yawing). This is an advantage in most situations. However, it would be possible to permit limited or unrestricted rotation of the rod—even while its was clamped against linear movement—by providing clearance between the clamp and the bottom of the recess, or by making at least one of those surfaces a surface of rotation, e.g., cylindrical.

I presently prefer to make the rear portion 12' of the bore 12—the portion aft of the clamp—larger than the portion forward of the bore, and to make the clamp's inner diameter about the same as the forward portion of the bore 12. Now, by attaching a collar 70 (FIG. 2) to the rear of the rod with a set screw 72 or the like, the rod is prevented from being removed from the body in a forward direction. And once a second screw 74 is installed in the hole 76 closely adjacent the rear end of the bore 12—so that its head is in the path of the collar—then the rod cannot be removed from the body in either direction, without first removing one or both of the set screws. These features should, however, be regarded as optional and not limiting the invention in its broadest sense.

It is contemplated that the invention will be particularly useful when two rod holders are installed at opposite ends of a common rod. This assembly can be used to interconnect movable objects of any type temporarily so that they can be moved as a unit. The objects might be different, such as the hospital bed and I.V. pole mentioned above. Or similar units, such as wheelchairs, could be joined into a train of chairs so that they could be moved by a single person. Trash cans could be similarly linked. The shape of the jaws may be modified according to the purposes for which a particular clamp is intended, and it is contemplated that an assortment of different jaws may be provided for such purposes.

Since the invention is subject to modifications and variations, it is intended that the forgoing description and the accompanying drawings shall be interpreted as only illustrative invention defined by the following claims.

I claim:

1. A device for securing a rod to a fixture, said device comprising
    a body having a through bore adapted to receive the rod for sliding movement therein,
    said body having a recess laterally intersecting said through bore,
    a clamp removably situated in the recess and having a bore aligned with the through bore, said clamp having a circumferential discontinuity so that its bore size is adapted to be change from a first size larger than the rod to a second size smaller than the rod, and tightening means for changing the clamp size from said first size to said second size,
    whereby the rod is adapted to be adjusted with respect to the body both lengthwise along the rod's axis and angularly about the rod's axis.

2. The invention of claim 1, wherein the body further comprises a jaw depending from one end of the body and a boss depending from the other end of the body, and a threaded actuator passing through a threaded portion of the boss toward the jaw, whereby the body can be clamped to a fixture.

3. The invention of claim 2, wherein the threaded portion is a separate metal insert seated in a hole in the boss.

4. The invention of claim 2, further comprising a pad disposed on the distal end of the threaded actuator, facing the jaw.

5. The invention of claim 1, wherein the bore has a first portion forward of the recess and a second portion rearward of the recess, and the second portion has a larger diameter than said first portion.

6. The invention of claim 5, further comprising an element attached to the rear end of the rod which is sized to pass through the second portion, but not through the first portion, to prevent the rod from being removed from the bore in a forward direction.

7. The invention of claim 6, further comprising a screw inserted in a hole at the rear of the body, adjacent said bore, with its head in the path of said element, to prevent the rod from being removed from the bore in a rearward direction.

8. The invention of claim 1, wherein the discontinuity is a gap extending on a radial plane from the bore of the clamp, the clamp having a hole extending perpendicularly to said plane, with a first portion on one side of the gap and a second portion on the other side of the gap, one of said hole portions being threaded and the other of said hole portions being unthreaded, and further comprising a threaded actuator passing through the unthreaded portion into the threaded portion, whereby the clamp can be tightened by turning the actuator.

9. A system for interconnecting two movable articles, said system comprising
    a rod having first and second ends,
    a first rod holder situated at said first end of the rod, and
    a second rod holder situated as said second end of the rod,
    each said rod holder comprising:
    a body having a through bore adapted to receive the rod for sliding movement therein,
    the body having a recess laterally intersecting the through bore,
    a clamp removably situated in the recess and having a bore aligned with the through bore, said clamp having a circumferential discontinuity so that its bore size can change from a first size larger than the rod to second size smaller than the rod, and tightening means for changing the clamp size from said first size to said second size,
    whereby the relative position of the first rod holder and the second rod holder, both lengthwise along the rod's axis and angularly about the rod's axis, can be adjusted.

10. The invention of claim 9, wherein each body further comprises a jaw depending from one end of the body and a boss depending from the other end of the body, and a threaded actuator passing through a threaded portion of the boss toward the jaw, whereby the body can be clamped to a fixture.

* * * * *